Figure 1:
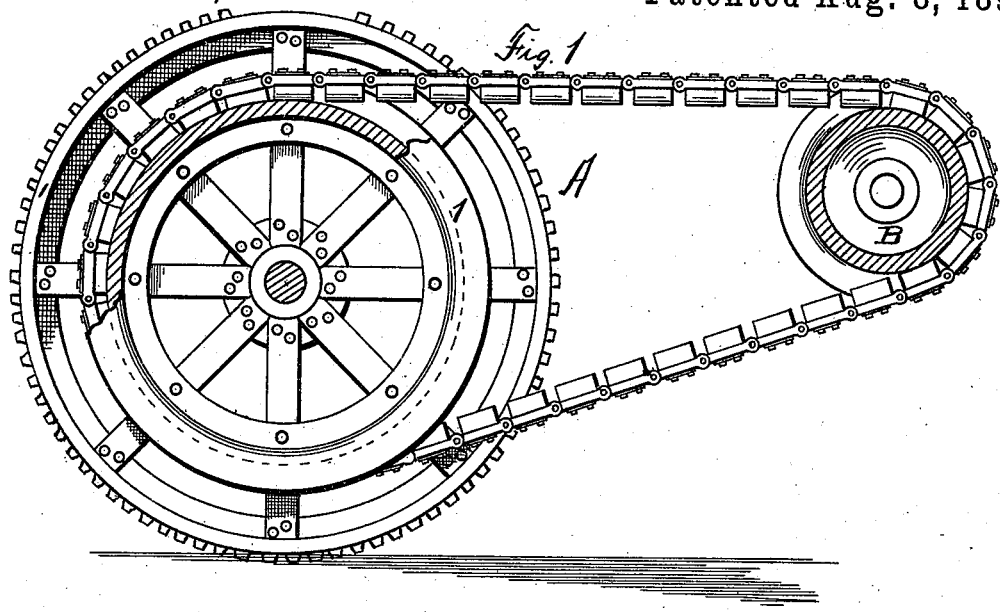

(No Model.)

S. J. WILBUR.
DRIVING BELT.

No. 502,798. Patented Aug. 8, 1893.

WITNESSES:
N. A. Cashart
Geo M Blevins

INVENTOR
Samuel J. Wilbur
By Smith & Denison
ATTORNEYS.

UNITED STATES PATENT OFFICE.

SAMUEL J. WILBUR, OF PENN YAN, NEW YORK.

DRIVING-BELT.

SPECIFICATION forming part of Letters Patent No. 502,798, dated August 8, 1893.

Application filed October 6, 1892. Serial No. 448,007. (No model.)

*To all whom it may concern:*

Be it known that I, SAMUEL J. WILBUR, of Penn Yan, in the county of Yates, in the State of New York, have invented new and useful Improvements in Belts for Traction-Engines, of which the following, taken in connection with the accompanying drawings, is a full, clear, and exact description.

My invention relates to the construction of belts or endless chains for traction engines, as a new article of manufacture.

My object is to produce, as a new article of manufacture, an endless chain or belt by constructing upon the several links, frictional bearing pieces, frusto-conical in shape in cross section, adapted to be united very closely, so as to increase the frictional surface upon the wheel. Heretofore these frictional pieces have been united by hooks constructed in one end and an eye in the opposite end, thereby necessitating a considerable distance between these bearing pieces, so that really a very small amount of the bearing surface would come upon the wheels, and to the end of obviating this and constructing the chain having these bearing pieces closely together, my invention consists in providing each link with a bearing piece constructed frusto-conical in form and connecting the links together, substantially as shown in the drawings; and in the several other novel features of construction and operation hereinafter described and which are specifically set forth in the claim hereunto annexed. It is constructed as follows, reference being had to the accompanying drawings, in which—

Figure 2:
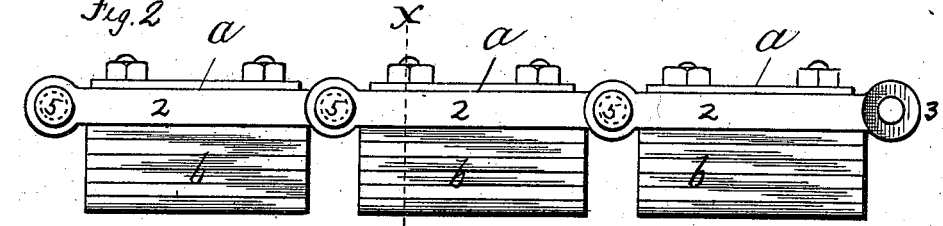
Figure 3:
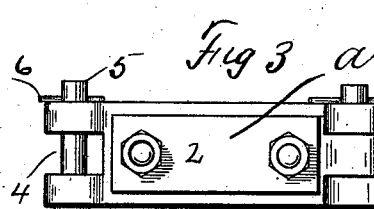
Figure 4:
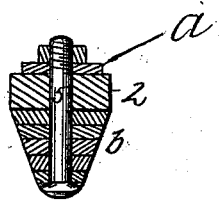

Figure 1, is a side view of a traction wheel, provided with my improved endless chain, mounted thereon, a portion of the trackway being removed. Fig. 2, is a side view of an enlarged portion of the belt. Fig. 3, is a top plan view thereof. Fig. 4, is a cross section on line $x\,x$, in Fig. 2.

A—, is a traction wheel constructed in any ordinary form, provided with a trackway —1—, upon which the belt travels.

B—, is a drive-wheel having a corresponding groove upon which the belt travels.

2—, are links or bars preferably of iron, forming the rigid portion of the chain, and are connected together at their ends by a tongue —3— and tenon —4— having an eye passing through them laterally, through which the bolt —5— passes, which bolt is secured in place by a key —6—.

I secure, by means of bolts —$a'$—, layers of leather or other material, which I term frictional bearing pieces —$b$—, frusto-conical in shape in cross section, or of such other shape as to travel in the guide-way upon the traction wheel. On the opposite face of these links —2—, are secured between the nuts of the said bolts —$a'$— and the links proper, protecting plates —$a$— the purpose of which is to distribute the clamping action of the bolts over the entire surface of the links thereby strengthening the same and tending to prevent loosening of the frictional strips, at the same time, effectually shielding the body of the link from the wearing action of the nuts. It will thus be observed that the great utility of this invention consists in shortening up the connections between the frictional bearing pieces —$b$—, thereby securing more friction upon the traction wheel. It will also be observed that when it is desired to remove the belt, one of the pins —5— may be removed, the belt taken off and laid down and again replaced without having all of the links separate, as is the case with the belt now in use.

What I claim as my invention, and desire to secure by Letters Patent, is—

In a belt, the combination with the links —2— provided with a tongue and tenon, of the eye and bolt connection between the links, the frictional bearing pieces —$b$— secured thereto, the securing bolts and the wearing and clamping plates —$a$—, as specified.

In witness whereof I have hereunto set my hand this 4th day of October, 1892.

S. J. WILBUR.

In presence of—
C. W. SMITH,
HOWARD P. DENISON.